US009166771B2

(12) United States Patent
Shibasaki

(10) Patent No.: US 9,166,771 B2
(45) Date of Patent: Oct. 20, 2015

(54) RECEPTION CIRCUIT

(71) Applicant: FUJITSU LIMITED, Kawasaki-shi, Kanagawa (JP)

(72) Inventor: Takayuki Shibasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/485,470

(22) Filed: Sep. 12, 2014

(65) Prior Publication Data

US 2015/0117579 A1    Apr. 30, 2015

(30) Foreign Application Priority Data

Oct. 25, 2013    (JP) .................................. 2013-222353

(51) Int. Cl.
*H04L 7/00* (2006.01)
*H04L 25/03* (2006.01)

(52) U.S. Cl.
CPC ............ *H04L 7/0058* (2013.01); *H04L 7/0029* (2013.01); *H04L 25/03885* (2013.01)

(58) Field of Classification Search
CPC ............ H04L 7/0058; H04L 25/03885; H04L 7/0029; H04L 2027/0016; H04L 2027/0053; H04L 2027/0067; H04L 2027/0069; H04L 25/03038; H04L 25/03133; H04L 25/063; H04L 25/4917; H04L 27/0014; H04L 7/0087; H04L 25/497; H04L 27/01; H04L 27/02; H04L 7/0054; H04L 7/0062; H04L 7/007; H04L 7/0337; H04L 25/06; H04L 25/4912
See application file for complete search history.

(56) References Cited

U.S. PATENT DOCUMENTS

| | | | |
|---|---|---|---|
| 8,694,837 B1 * | 4/2014 | Qian et al. ..................... | 714/704 |
| 9,025,655 B1 * | 5/2015 | Ramadoss et al. ............ | 375/233 |
| 2005/0201491 A1 * | 9/2005 | Wei ............................... | 375/326 |
| 2007/0230640 A1 | 10/2007 | Bryan et al. | |
| 2008/0069199 A1 * | 3/2008 | Chen et al. .................... | 375/233 |
| 2008/0310569 A1 | 12/2008 | Takeuchi | |
| 2009/0224806 A1 * | 9/2009 | Huang et al. .................. | 327/72 |
| 2009/0285277 A1 * | 11/2009 | Sunaga et al. ................ | 375/233 |
| 2010/0046683 A1 * | 2/2010 | Beukema et al. ............. | 375/355 |
| 2010/0238993 A1 * | 9/2010 | Huang et al. .................. | 375/233 |
| 2011/0311008 A1 * | 12/2011 | Slezak et al. .................. | 375/353 |

(Continued)

FOREIGN PATENT DOCUMENTS

| | | |
|---|---|---|
| JP | 2008-301337 A | 12/2008 |
| JP | 2009-531974 A | 9/2009 |

(Continued)

*Primary Examiner* — Hirdepal Singh
(74) *Attorney, Agent, or Firm* — Arent Fox LLP

(57) ABSTRACT

A reception circuit includes: an equalizer; a comparator to compare an output signal of the equalizer with first, second, and third thresholds at a first-timing to output first, second, and third comparison-results, respectively; a selector to select any one of the first and second comparison-results based on a determination-result at a timing before the first-timing, and update the determination-result; a detector to detect a phase information based on the first or second comparison-result not selected; a shifter to adjust a sampling clock phase based on the phase information detected; and a controller to set a third threshold based on the first and second thresholds by either adjusting the first and second thresholds based on the output signal amplitude or adding/subtracting a first value to/from the output signal, detect an equalization-result based on the third comparison-result by the set third threshold, and adjust an equalization coefficient based on the detected equalization-result.

5 Claims, 15 Drawing Sheets

(56) References Cited

U.S. PATENT DOCUMENTS

| | | |
|---|---|---|
| 2012/0092049 A1 | 4/2012 | Hasegawa |
| 2012/0201289 A1* | 8/2012 | Abdalla et al. ............... 375/233 |
| 2012/0230384 A1 | 9/2012 | Chiba |
| 2013/0243070 A1* | 9/2013 | Ito et al. ...................... 375/233 |
| 2013/0243127 A1* | 9/2013 | Chmelar et al. ............. 375/316 |
| 2014/0169426 A1* | 6/2014 | Aziz et al. ................... 375/224 |

FOREIGN PATENT DOCUMENTS

| | | |
|---|---|---|
| JP | 2012-191509 A | 10/2012 |
| WO | WO 2008/032492 A1 | 3/2008 |
| WO | WO 2010/150624 A1 | 12/2010 |
| WO | WO2012029597 * | 3/2012 |

* cited by examiner

SELECTOR 5

FIG.5

| Dn-1 | Dp_n | Dn_n | Dn+1 | UP/DN |
|---|---|---|---|---|
| 0 | 1 | 1 | 1 | +1 |
| 0 | 0 | 1 | 1 | −1 |
| 1 | 0 | 0 | 0 | +1 |
| 1 | 0 | 1 | 0 | −1 |
| Other | | | | 0 |

FIG.12

| Dn-2 | Dn-1 | Dpp_n | Dpn_n | Dnp_n | Dnn_n | Dn+1 | UP/DN |
|---|---|---|---|---|---|---|---|
| 0 | 0 | 0 | 1 | 1 | 1 | 1 | +1 |
| 0 | 0 | X | 0 | 1 | 1 | 1 | −1 |
| 1 | 0 | 1 | X | 1 | 1 | 1 | +1 |
| 1 | 0 | 0 | 1 | 1 | 1 | 1 | −1 |
| 0 | 1 | 0 | 0 | 0 | 0 | 0 | +1 |
| 0 | 1 | 0 | 0 | X | 1 | 0 | −1 |
| 1 | 1 | 0 | 0 | 0 | X | 0 | +1 |
| 1 | 1 | 0 | 0 | 1 | 1 | 0 | −1 |
| Other | | | | | | | 0 |

RECEPTION CIRCUIT

CROSS-REFERENCE TO RELATED APPLICATION

This application is based upon and claims the benefit of priority from the prior Japanese Patent Application No. 2013-222353 filed on Oct. 25, 2013, the entire contents of which are incorporated herein by reference.

FIELD

The embodiments discussed herein are related to a reception circuit.

BACKGROUND

With a performance improvement of an information processing apparatus, a high-speed data rate of a data signal transmitted and received inside and outside of an apparatus has been achieved in recent years. A data signal reception circuit determines an amplitude level of a data signal at timing synchronized with a sampling clock and performs data reproduction based on the determination result. When a high speed data rate is implemented, a slight phase deviation occurring between the data signal and the sampling clock has an influence on an accuracy of data detection. Accordingly, a technology called a tracking CDR (Clock and Data Recovery) which detects the phase deviation and synchronizes a phase of the sampling clock with a phase of the data signal is utilized. The tracking CDR technology includes a technology called a 2× tracking CDR which performs sampling on a 1-bit data twice and a technology called a baud rate tracking CDR which performs sampling on a 1-bit data once.

The baud rate tracking CDR compares the data signal at an adjacent sampling timing with a total of three threshold values, which includes a threshold value for data determination and two threshold values for phase detection, to detect the phase deviation of the sampling clock with respect to the data signal. Therefore, three comparators that compare the data signal with the threshold values are utilized.

Further, an equalization circuit which compensates the received data signal so as to suppress deterioration of a reception sensitivity is used in a reception circuit. As one of equalization circuits, there is a decision feedback equalizer (DFE) which determines whether the output data is 0 (zero) or 1 (one) and feedbacks and uses the determination result so as to suppress amplification of a noise input. Further, there is a speculative DFE adopted as a scheme of achieving a high operational speed of the DFE. The speculative DFE performs an equalization process in advance for all data patterns in a case where the data to be fed back is 0 (zero) or 1 (one). Also, when the data has been fed back, an equalization result corresponding to the data is selected and output. Accordingly, feedback loop processings are reduced and thus the high operational speed of the DFE is implemented. The speculative DFE utilizes a comparator to determine whether data is 0 or 1. When the number of taps is "N", the number of comparators becomes $2^N$.

When the baud rate tracking CDR and the speculative DFE described above are utilized in the reception circuit, the number of comparators increases and thus a circuit scale becomes large.

Related techniques are disclosed in, for example, International Publication Pamphlet No. WO 2008/032492, International Publication Pamphlet No. WO 2010/150624, and Japanese Laid-Open Patent Publication No. 2008-301337.

SUMMARY

According to an aspect of the invention, a reception circuit to reproduce a data signal based on a data determination result of determining an amplitude level of an input data signal at a sampling timing synchronized with a sampling clock, includes: an equalizer configured to perform an equalization process on the input data signal; a comparator configured to compare an output data signal of the equalizer with a first threshold value, a second threshold value, and a third threshold value at a first sampling timing to output a first comparison result, a second comparison result, and a third comparison result, respectively; a selector configured to select any one of the first comparison result and the second comparison result based on the data determination result at a second sampling timing before the first sampling timing, and update the data determination result; a phase detector configured to detect a phase information based on the first comparison result or the second comparison result which is not selected by the selector; a phase shifter configured to adjust a phase of the sampling clock based on the phase information detected by the phase detector; and a controller configured to set a third threshold value based on the first threshold value and the second threshold value by either adjusting the first threshold value and the second threshold value based on the amplitude of the output data signal or adding or subtracting a first value to or from the output data signal, detect an equalization result at the equalizer based on the third comparison result by the set third threshold value, and adjust an equalization coefficient of the equalizer based on the detected equalization result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a view illustrating an example of a phase detection algorithm;

FIG. 12 is a view illustrating another example of the phase detection algorithm;

DESCRIPTION OF EMBODIMENTS

Hereinafter, exemplary embodiments of the present disclosure will be described with reference to accompanying drawings.

First Embodiment

Figure 1:
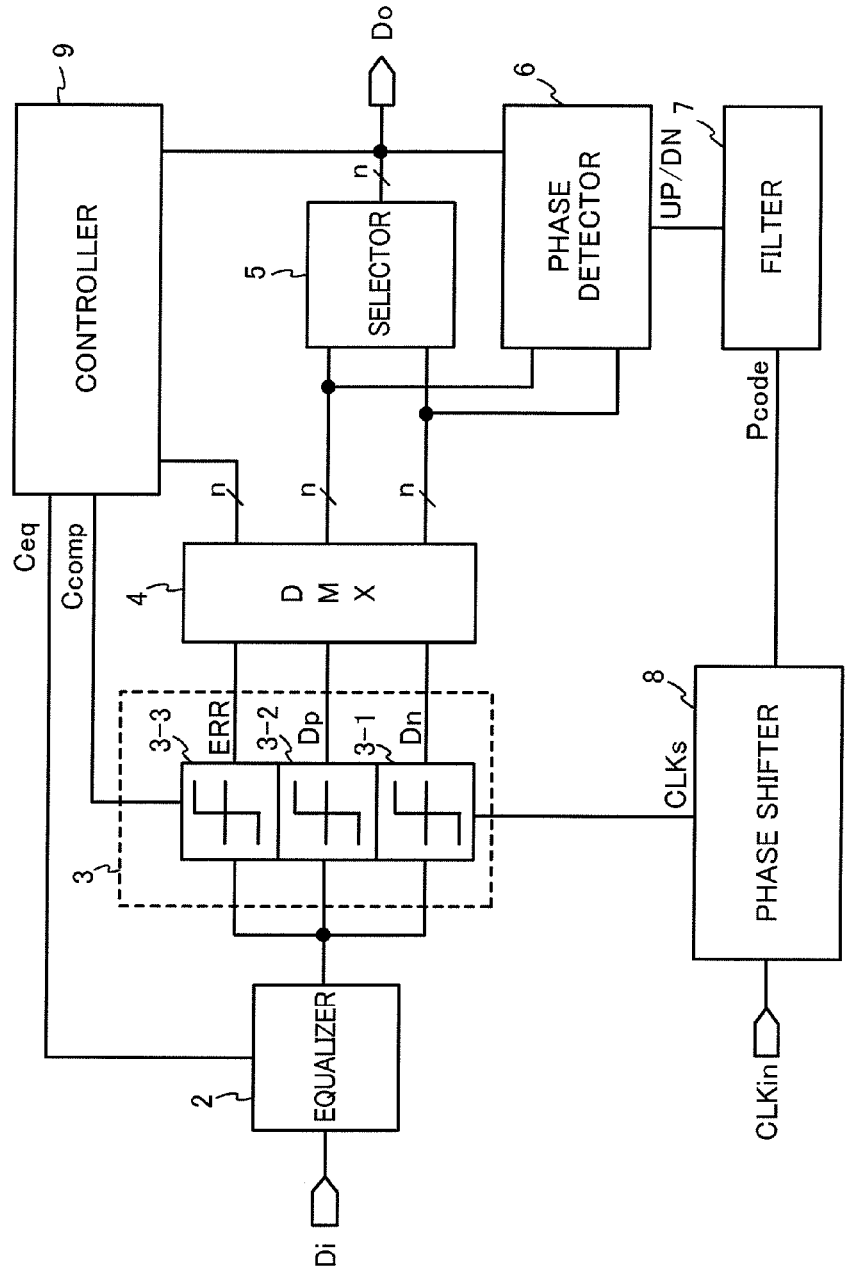
FIG. 1 is a view illustrating an exemplary reception circuit according to a first embodiment.

FIG. 1 is a view illustrating an exemplary reception circuit according to a first embodiment of the present disclosure. A reception circuit 1 is provided with functionalities of a 1-tap speculative DFE and a baud rate tracking CDR, and includes an equalizer 2, a comparator 3, a de-multiplexer (hereinafter, denoted by a "DMX") 4, a selector 5, a phase detector 6, a filter 7, a phase shifter 8, and a controller 9.

The equalizer 2 performs an equalization process on an input data signal Di. The comparator 3 compares an output data signal of the equalizer 2 with three threshold values at a certain sampling timing and outputs the comparison results. The comparator 3 includes three comparators 3-1, 3-2 and 3-3. The comparator 3-1 compares the output data signal of the equalizer 2 with a first threshold value for DFE and outputs a comparison result Dn. The comparator 3-2 compares the output data signal of the equalizer 2 with a second threshold value for DFE and outputs a comparison result Dp. The second threshold value is greater than the first threshold value in the reception circuit 1 of the first embodiment. The comparator 3-3 compares the output data signal of the equalizer 2 with a threshold value for error detection and outputs a comparison result ERR.

The DMX 4 performs inverse multiplexing on 1-bit comparison results ERR, Dp and Dn to be divided into n bits, and supplies the inverse-multiplexed comparison result ERR to the controller 9 and supplies the inverse-multiplexed comparison results Dp and Dn to the selector 5 and the phase detector 6, respectively. Inverse multiplexing is a technique which divides a single stream of data into multiple streams of data. The selector 5 selects any one of the comparison results Dn and Dp based on a result of the data determination at a sampling timing before one of the sampling timing used in the comparator 3 and updates the data determination result Do. For example, when the determination result Do at the timing before one of the sampling timing is 0, the comparison result Dn is selected at the current sampling timing and when the determination result Do at the timing before one of the sampling timing is 1, the comparison result Dp is selected at the current sampling timing.

The phase detector 6 detects a phase information UP/DN based on the comparison result Dn or Dp which is not selected in the selector 5. For example, the phase detector 6 detects the phase information UP/DN depending on whether the comparison result Dn or Dp which is not selected in the selector 5 is 1 or 0. A phase detector used as the phase detector 6 is not a Mueller-Muller (MM) phase detector which detects the phase from the amplitude used in a baud rate tracking CDR, but a Bang-Bang (BB) type phase detector which detects the phase information from data edge information.

For example, when a data pattern is a 3-bit continuous data that is "011", the comparison result Dn is used for the data determination at the sampling timing for the second bit, and thus the phase information UP/DN is detected based on the comparison result Dp which is not used for the data determination. For example, when the comparison result Dp is 1, it is determined that the phase of the sampling clock CLKs lags behind the phase of the output data signal of the equalizer 2. In this case, the phase detector 6 sets the phase information UP/DN, for example, as "+1". When the comparison result Dp is 0, it is determined that the phase of the sampling clock CLKs is ahead of the output data signal of the equalizer 2. In this case, the phase detector 6 sets the phase information UP/DN, for example, as "−1".

The filter 7 filters the phase information UP/DN to generate a phase adjustment code Pcode. In the meantime, the filter 7 is not limited to a digital filter and may be a circuit which includes for example, a charge pump which adjusts electric current according to the phase information UP/DN, and converts and outputs the adjusted current value into a voltage value.

The phase shifter 8 generates a sampling clock CLKs from an input clock CLKin. Further, the phase shifter 8 receives the phase adjustment code Pcode as an input and adjusts the phase of the sampling clock CLKs based on the phase information UP/DN detected by the phase detector 6. For example, when the phase information UP/DN is "+1", the phase shifter 8 advances the phase of the sampling clock CLKs, and when the phase information UP/DN is "−1", the phase shifter 8 delays the phase of the sampling clock CLKs.

The controller 9 adjusts the first threshold value and the second threshold value for DFE based on amplitude of the output data signal of the equalizer 2. The controller 9 may detect the amplitude of the output data signal of the equalizer 2 from a threshold value at the time when the comparison result ERR of the threshold value with the output data signal is switched from 0 to 1 or from 1 to 0 by changing the threshold value for error detection. Further, the controller 9 adjusts the first threshold value and the second threshold value based on the detected amplitude in the reception circuit 1 of the first embodiment. An example of a threshold value adjustment method will be described in later (see FIG. 3).

Further, the controller 9 sets the threshold value for error detection based on the adjusted first threshold value and second threshold value for DFE, detects the equalization result in the equalizer 2 based on the comparison result ERR by the set threshold value for error detection, and adjusts an equalization coefficient Ceq based on the detected equalization result.

When setting a threshold value for error detection, the controller 9 sets the threshold value for error detection to a value obtained by adding or subtracting an expectation value of the amplitude of the output data signal from the equalizer 2 to or from, for example, each of the first threshold value and the second threshold value. Also, the controller 9 adjusts the equalization coefficient Ceq of the equalizer 2 so as to cause a probability of occurrence of 0 (zero) to be equal to that of 1 (one) in the comparison result ERR. Accordingly, an input waveform, which is suitable for the phase detection, to the comparator 3 is obtained. In the meantime, three threshold values described above are collectively denoted by Ccomp in FIG. 1.

Figure 2:
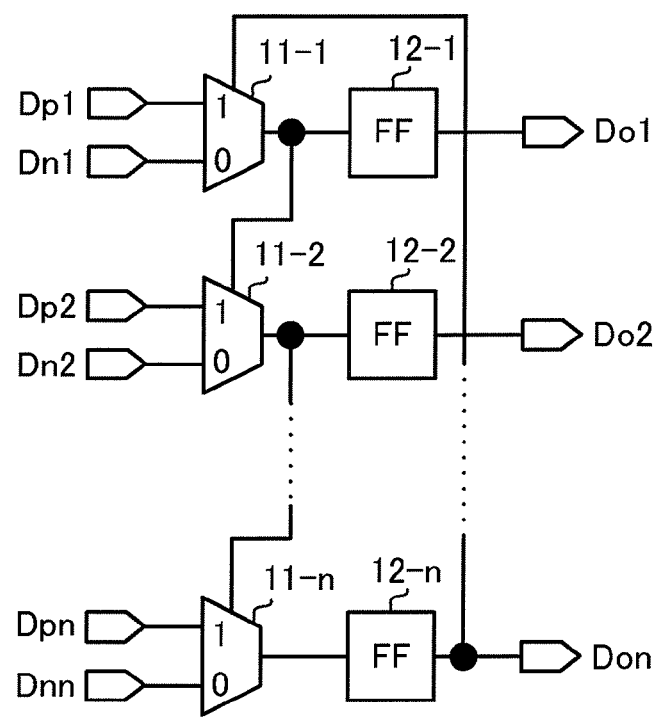
FIG. 2 is a view illustrating an exemplary selector.

FIG. 2 is a view illustrating an exemplary selector. The selector 5 includes selectors 11-1, 11-2, . . . , 11-n that select comparison results Dp1, Dp2, . . . , Dpn or comparison results Dn1, Dn2, . . . , Dnn that are multiplexed. The comparison results Dp1 to Dpn and Dn1 to Dnn are n-bit parallel data and arranged in a row of chronological data in a sequential order of 1 to n.

Further, the selector 5 includes flip-flops (FF) 12-1, 12-2, . . . , 12-n that maintain results selected in the selectors 11-1 to 11-n. Though not illustrated, a clock signal is input to the FFs 12-1 to 12-n, and the FFs 12-1 to 12-n are operated at the same timing to output the data determination results Do1, Do2, . . . , Don. The operating cycle of the FFs 12-1 to 12-n amounts to nUI [time for n bits of the input data signal Di of the reception circuit 1].

Each of the selectors 11-1 to 11-n outputs each of the comparison results Dp1 to Dpn when each of the data determination results Do1 to Don one bit ahead of the current bit is "1", and outputs each of the comparison results Dn1 to Dnn when each of the data determination results Do1 to Don one bit ahead of the current bit is "0". Therefore, for example, the selector 11-1 receives the data determination result Don output from the FF 12-n as an input of a selection signal and the selector 11-2 receives the result selected in the selector 11-1 as an input of a selection signal. The selector 5 may be implemented with a circuit described above.

Example of Operation of Reception Circuit 1

Hereinafter, an example of operation of the reception circuit 1 of the present embodiment will be described. First, the controller 9 detects the amplitude of the output data signal of the equalizer 2 from a threshold value at the time when the comparison result ERR of the threshold value with the output data signal is switched from "0" to "1" or from "1" to "0" by changing the threshold value for error detection.

Hereinafter, it is assumed that the amplitude indicates a difference from the center of change to the maximum value or the minimum value of the output data signal and the amplitude level indicates magnitude of the output data signal at a certain time.

Figure 3:
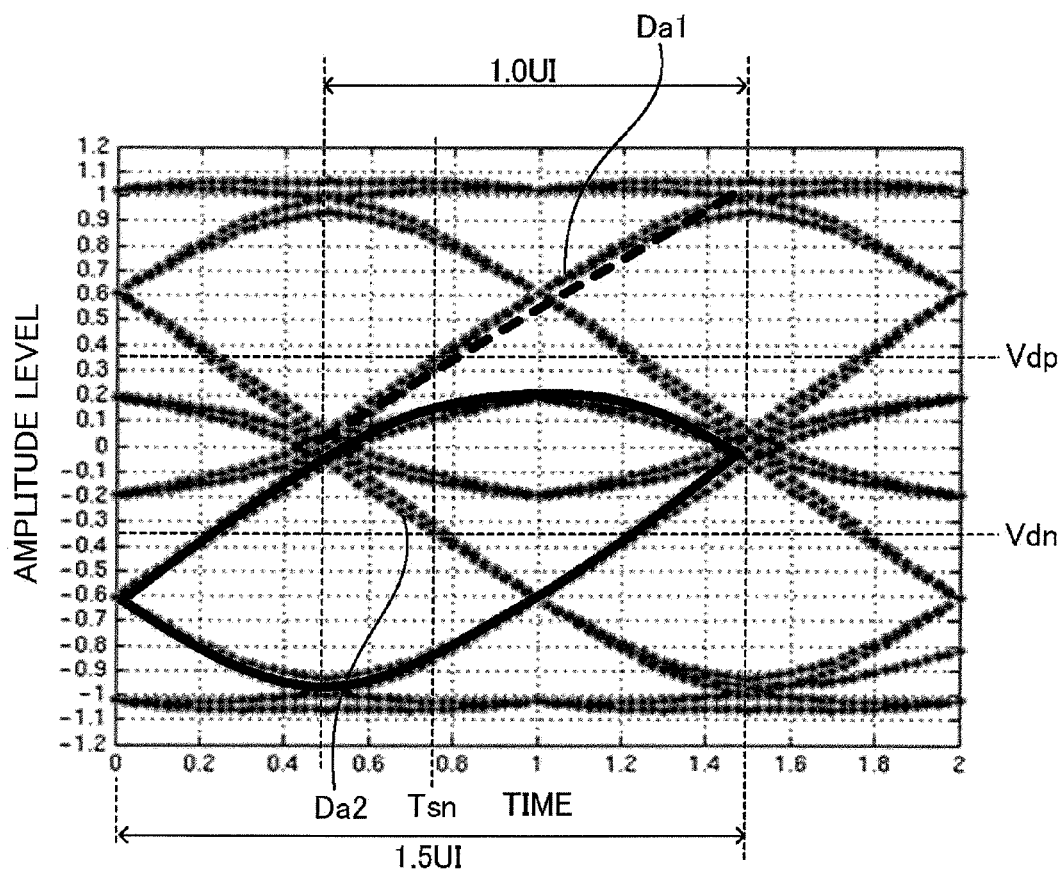
FIG. 3 is a view illustrating examples of adjustments of two threshold values for DFE.

Thereafter, the controller 9 adjusts two threshold values for DFE based on the detected amplitude. FIG. 3 is a view illustrating examples of adjustment of two threshold values for DFE. In FIG. 3, the output data signals having a plurality of data patterns of the equalizer 2 are represented to overlap with each other. The horizontal axis indicates time and the vertical axis indicates amplitude level of the output data signal. In the meantime, the amplitude of the output data signal is normalized to "±1".

Data determination may be accurately performed for an input that has a small loss, for example, an input which requires a time less than 1UI for switching data from "0" to "1", and thus an equalization process may not be performed on the input. FIG. 3 illustrates an example in which a time for shifting data from "0" to "1" is defined as about 2UI due to an influence by ISI (Inter Symbol Interference) caused by adjacent bits. For example, a size of an eye opening in a direction of phase (direction of time) in a case where the determined data one bit ahead of the current bit is 0 (zero) is defined as about 1.5UI. The sampling phase (sampling timing) Tsn may be set to be a phase of the center of the eye opening in order to increase an accuracy of data determination.

In order to detect a suitable phase, the threshold values Vdp and Vdn may be set so that positions in the direction of phase of cross points between data for phase detection, which varies with a specific data pattern, and the threshold values Vdp and Vdn for DFE correspond to phases located at the center of the eye opening. FIG. 3 illustrates the output data signal Da1, which has a data pattern of 3-bit continuous data that is assumed as "011", of the equalizer 2 and the output data signal Da2, which has a data pattern of 3-bit continuous data that is assumed as "100", of the equalizer 2, as an example of the data for phase detection. In the output data signals Da1 and Da2 described above, when a slope is linearly approximated for 1UI where the amplitude level is changed from "0" to "1" or from "0" to "4", the threshold value Vdp and the threshold value Vdn may be set to "+0.25" and "−0.25", respectively. However, since non-linearity is strong near the portion at which the amplitude level is "1" or "4", the period of time needed for shifting data from "0" to "1" or from "1" to "0" becomes slightly smaller than 2UI and absolute values of the optimal threshold values Vdp and Vdn also become slightly larger than "0.25". Therefore, in FIG. 3, the threshold value Vdp is set to about "+0.35" and the threshold value Vdn is set to about "−0.35". The threshold value Vdp and the threshold value Vdn adjusted as described above are set in the comparator 3-2 and the comparator 3-2, respectively. Adjustment of the threshold value to be set in the comparator 3-3 will be described later.

Next, descriptions will be made on the data determination process, phase detection process, and phase adjustment process using the threshold values Vdp and Vdn that are adjusted as described above.

Figure 4:
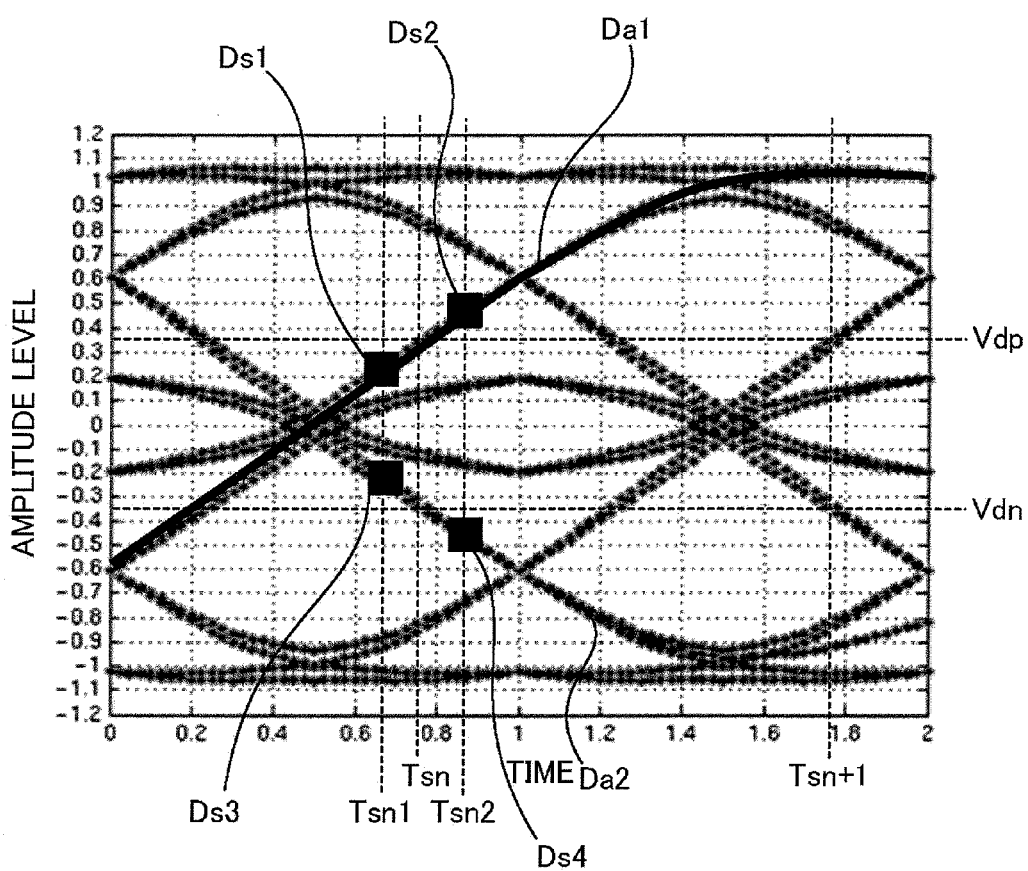
FIG. 4 is a view explaining an example of a data determination process, a phase detection process and a phase adjustment process.

FIG. 4 is a view explaining an example of a data determination process, a phase detection process, and a phase adjustment process. Similarly as in FIG. 3, the output data signals of the equalizer 2 having a plurality of data patterns are represented to be overlap with each other. The horizontal axis indicates time and the vertical axis indicates amplitude level of the output data signals. In the meantime, the amplitudes of the output data signal are normalized to "±1".

When a sampling phase is a sampling phase Tsn1 which is ahead of the sampling phase Tsn which becomes the phase of the center of the eye opening described above, a sample value Ds1 of the output data signal Da1 of the data for phase detection is larger than the threshold value Vdn and smaller than the threshold value Vdp. Therefore, the comparison result Dn becomes "1" and the comparison result Dp becomes "0". Since the data determination result Do at a sampling timing ahead of the sampling phase Tsn1 is "0" in the output data signal Da1, the comparison result Dn is selected and the data determination result Do is updated in the selector 5. That is, it is determined that the output data signal Da1 is "1" at the sampling phase Tsn1.

In the meantime, the phase detector 6 detects the phase information based on the comparison result Dpn which is not selected in the selector 5. In the example of FIG. 4, it is found out that the comparison result Dp is "0" and thus the sampling phase Tsn 1 is ahead of the ideal sampling phase Tsn. Therefore, the phase detector 6 outputs "−1" as the phase information UP/DN. Accordingly, the phase shifter 8 adjusts the phase of sampling clock CLKs so as to make the sampling phase slower.

When the sampling phase is a sampling phase Tsn2 which lags behind the sampling phase Tsn which becomes the phase of the center of the eye opening described above, a sample value Ds2 of the output data signal Da1 of the data for phase detection is larger than the threshold value Vdn and the threshold value Vdp. Therefore, the comparison result Dn becomes "1" and the comparison result Dp also becomes "1". Since the data determination result Do at a sampling timing ahead of the sampling phase Tsn1 is "0" in the output data signal Da1, the comparison result Dn is selected and the data determination result Do is updated in the selector 5. That is, it is also determined that the output data signal Da1 is "1" at the sampling phase Tsn2.

In the meantime, the phase detector 6 detects the phase information based on the comparison result Dp which is not selected in the selector 5. In the example of FIG. 4, it is found out that the comparison result Dp is "1" and thus the sampling phase Tsn2 lags behind the ideal sampling phase Tsn. Therefore, the phase detector 6 outputs "+1" as the phase information UP/DN. Accordingly, the phase shifter 8 adjusts the phase of sampling clock CLKs so as to make the sampling phase faster.

The same data determination process, phase detection process, and phase adjustment process may be applied even when the output data signal Da2 having a data pattern which is "100" is set as the data for phase detection. When a sampling phase is the sampling phase Tsn1 which is ahead of the sampling phase Tsn which becomes the phase of the center of the eye opening described above, a sample value Ds3 of the output data signal Da2 of the data for phase detection is larger than the threshold value Vdn and smaller than the threshold value Vdp. Therefore, the comparison result Dn becomes "1" and the comparison result Dp becomes "0". Since the data determination result Do at a sampling timing ahead of the sampling phase Tsn1 is "1" in the output data signal Da2, the comparison result Dp is selected and the data determination result Do is updated in the selector 5. That is, it is determined that the output data signal Da1 is "0" at the sampling phase Tsn1.

In the meantime, the phase detector 6 detects the phase information based on the comparison result Dnn which is not selected in the selector 5. In the example of FIG. 4, it is found out that the comparison result Dn is "1" and thus the sampling phase Tsn1 is ahead of the ideal sampling phase Tsn. Therefore, the phase detector 6 outputs "−1" as the phase information UP/DN. Accordingly, the phase shifter 8 adjusts the phase of sampling clock CLKs so as to make the sampling phase slower.

When a sampling phase is a sampling phase Tsn2 which lags behind the sampling phase Tsn which becomes the phase of the center of the eye opening described above, a sample value Ds4 of the output data signal Da2 of the data for phase detection is smaller than the threshold value Vdn and the threshold value Vdp. Therefore, the comparison result Dn becomes "0" and the comparison result Dp also becomes "0". Since the data determination result Do at the sampling timing ahead of the sampling phase Tsn1 is "1" in the output data signal Da2, the comparison result Dp is selected and the data determination result Do is updated in the selector 5. That is, it is also determined that the output data signal Da1 is "1" at the sampling phase Tsn2.

In the meantime, the phase detector 6 detects the phase information based on the comparison result Dnn which is not selected in the selector 5. In the example of FIG. 4, it is found out that the comparison result Dn is "0" and thus the sampling phase Tsn2 lags behind the ideal sampling phase Tsn. Therefore, the phase detector 6 outputs "+1" as the phase information UP/DN. Accordingly, the phase shifter 8 adjusts the phase of sampling clock CLKs so as to make the sampling phase faster.

FIG. 5 is a view illustrating an example of a phase detection algorithm. FIG. 5 is a summary of phase detection algorithm as illustrated in FIG. 4. Dn−1 and Dn+1 indicate an (n−1)-th bit data determination result and an (n+1)-th bit data determination result, respectively. Dp_n and Dn_n indicate an n-th bit comparison result Dp and an n-th bit comparison result Dn, respectively.

When a data pattern is "011", that is, Dn−1 is "0" and Dn_n and Dn+1 are "1", the phase information UP/DN is changed according to a value of Dp_n. For example, when Dp_n is "1", the phase information UP/DN becomes "+1" and when Dp_n is "0", the phase information UP/DN becomes "−1".

When a data pattern is "100", that is, Dn−1 is "1" and Dp_n and Dn+1 are "0", the phase information UP/DN is changed according to a value of Dn_n. For example, when Dn_n is "0", the phase information UP/DN becomes "+1", and when Dn_n is "1", the phase information UP/DN becomes "−1".

In the meantime, in the example of FIG. 5, when another data pattern is input, the phase information UP/DN becomes "0". Although the phase detection algorithm described above represents an example in which the phase information UP/DN is detected based on a specific data pattern of three bits, the phase detection algorithm is not limited thereto. The phase detection algorithm may be configured to detect the phase information UP/DN based on a specific data pattern of two or four bits in the three bits may be in the phase detection algorithm.

The phase information UP/DN obtained as described above is input to the filter 7 and the filter 7 filters the phase information UP/DN to generate the phase adjustment code Pcode. Accordingly, a phase adjustment of the sampling clock CLKs is performed by the phase shifter 8. As illustrated in FIG. 4, in a case of the sampling phase Tsn1, the phase shifter 8 performs an adjustment which delays a phase so that the sampling phase Tsn1 comes near the ideal sampling phase Tsn. In a case of the sampling phase Tsn2, the phase shifter 8 performs an adjustment which advances a phase to cause the sampling phase Tsn2 to be near the ideal sampling phase Tsn.

The controller 9 waits for a predetermined time in order to wait for the sampling phase to be converged with respect to the threshold values Vdp and Vdn. Thereafter, the controller 9 sets the threshold value for error detection based on the threshold values Vdp and Vdnn and adaptively controls an equalization coefficient Ceq of the equalizer 2.

Figure 6:
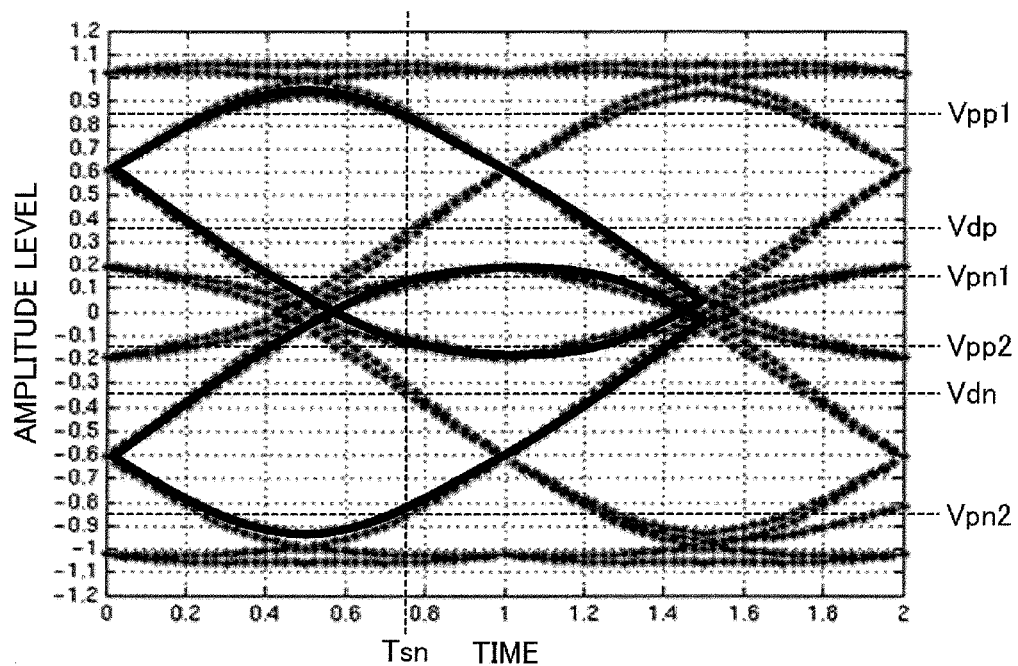
FIG. 6 is a view illustrating an example of threshold value for error detection.

FIG. 6 is a view illustrating an example of a threshold value for error detection. FIG. 6 illustrates threshold values Vpp1, Vpp2, Vpn1 and Vpn2 for error detection, in addition to the threshold values Vdp and Vdn illustrated in FIG. 3 and FIG. 4.

Here, the threshold value Vpp1 is a value obtained by adding an expectation value of the amplitude of the output data signal after the equalization process to the threshold value Vdp, and the threshold value Vpp2 is a value obtained by subtracting the expectation value of the amplitude of the output data signal after the equalization process from the threshold value Vdp. Further, the threshold value Vpn1 is a value obtained by adding an expectation value of the amplitude of the output data signal after the equalization process to the threshold value Vdn, and the threshold value Vpn2 is a value obtained by subtracting the expectation value of the amplitude of the output data signal after the equalization process from the threshold value Vdn.

An adjustment velocity of the equalization coefficient Ceq may be slower than a phase adjustment velocity and thus, the controller 9 sequentially shifts the threshold value Vpp1, Vpp2, Vpn1 and Vpn2 to be set in the comparator 3-3. Also, when the output data signal of the equalizer 2 is larger than a threshold value which is set in the comparator 3-3, the comparison result ERR becomes "1". When the output data signal of the equalizer 2 is smaller than the threshold value, the comparison result ERR becomes "0".

Assuming that the LMS (Least Mean Square) algorithm is used, the controller 9 adjusts the equalization coefficient Ceq based on the following Equation (1), based on the comparison result ERR.

$$Ceqn+1 = Ceqn + \mu ERR nDn-1 \tag{1}$$

In Equation (1), "Ceqn+1" is an equalization coefficient Ceq at (n+1)-th cycle and "Ceqn" is an equalization coefficient Ceq at n-th cycle. "μ" is a quantity (step width) which increases the equalization coefficient Ceq at the next cycle upon the error detection. The "ERRn" corresponds to a comparison result ERR at n-th cycle and the "Dn−1" is a data determination result at (n−1)-th cycle. In the meantime, the "ERRn" may be represented by the following Equation (2).

$$ERRn = Yn - dDn \qquad (2)$$

In Equation (2), "Yn" is the amplitude of the output data signal before the data determination after the equalization process at n-th cycle, "d" is an expectation value of the amplitude of the output after the equalization process described above, and "Dn" is the data determination result at n-th cycle. However, the "ERRn" becomes "0" or "1" indicated by the comparison results of the amplitude of the output data signal with the threshold values Vpp1, Vpp2, Vpn1 and Vpn2 and an arithmetic operation of Equation (2) is not performed in the present embodiment, as described above.

Figure 7:
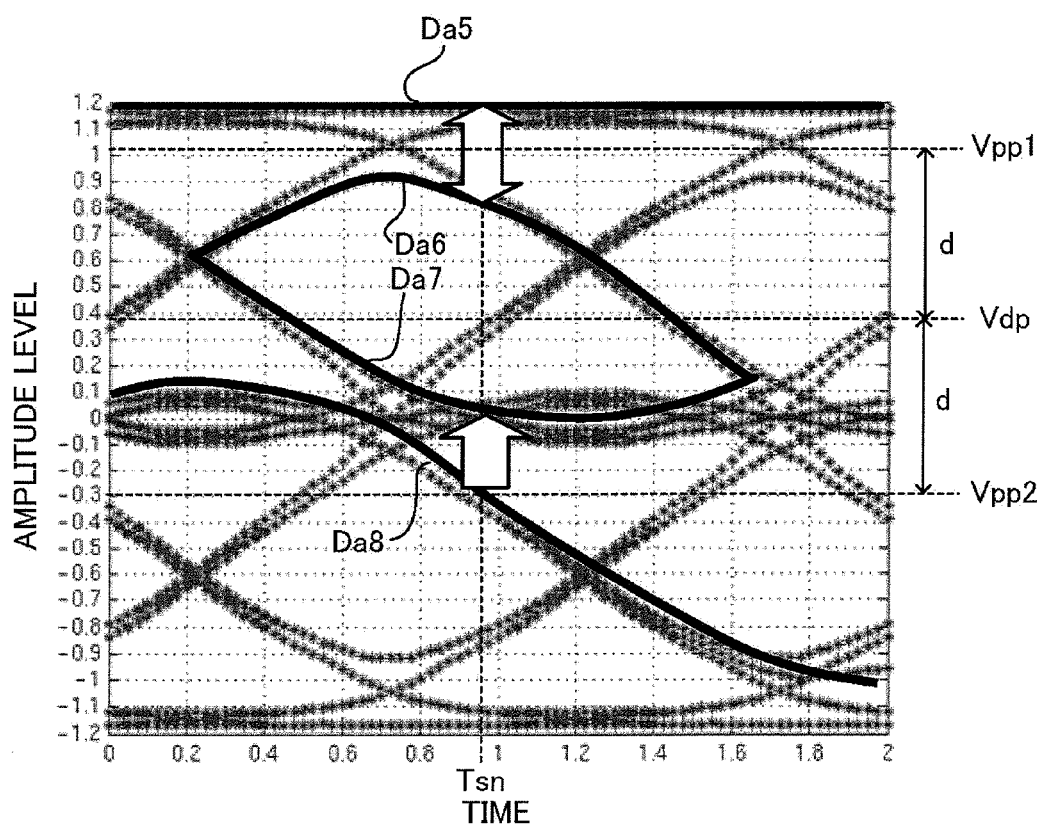
FIG. 7 is a view illustrating an example of an output data signal of an equalizer when an equalization level is low.

FIG. 7 is a view illustrating an example of an output data signal of an equalizer when an equalization level is low. The output data signals Da5, Da6, Da1 and Da8 illustrated in FIG. 7 are the sampling phases right before the sampling phase Tsn and are determined as having the data determination result of "1". The error detection is performed for the output data signals Da5, Da6, Da7 and Da8 using the threshold values Vpp1 and Vpp2 obtained by adding or subtracting the expectation value "d" to and from the threshold value Vdp.

When the equalization level is low, the output data signals Da5, Da6, Da7 and Da8 exceed the threshold values Vpp1 and Vpp2 and thus a probability that the comparison result ERR becomes 1 is high. In the example of FIG. 7, when the threshold value for error detection is set as the threshold value Vpp1, the output data signal Da5 is larger than the threshold value Vpp1 and thus the comparison result ERR becomes 1. The output data signals Da6, Da7 and Da8 other than the output data signal Da5 are smaller than the threshold value Vpp1 and thus the comparison result ERR becomes 0. In the meantime, when the threshold value for error detection is set as the threshold value Vpp2, the output data signals Da5, Da6, Da7 and Da8 are larger than the threshold value Vpp2 and thus all the comparison results ERR become 1. Accordingly, the probability that the comparison result ERR becomes 1 increases as a total.

When the probability that the comparison result ERR becomes 1 is high, the equalization coefficient Ceq is increased by the controller 9. In the meantime, an error detection using the threshold values Vpn1 and Vpn2 illustrated in FIG. 6 is performed in the same manner. Performing the error detection by sequentially shifting the threshold values Vpp1, Vpp2, Vpn1 and Vpn2 and adjusting the equalization coefficient Ceq are to maintain symmetry of input waveforms to the comparator 3. Further, since the threshold values Vpp1, Vpp2, Vpn1 and Vpn2 are set in the same comparator 3-3 at different timings, an increase of the number of comparators is not caused and thus an increase of a circuit area may be suppressed.

The controller 9 repeats a processing of waiting for the sampling phase to be converged with respect to the threshold values Vdp and Vdn and a processing of adjusting the equalization coefficient Ceq, and determines that the sampling phase is converged at the time when an amount of change of the equalization coefficient Ceq falls within a predetermined range. Accordingly, the reception circuit 1 completes an initial operation and proceeds to a normal operation.

Figure 8:
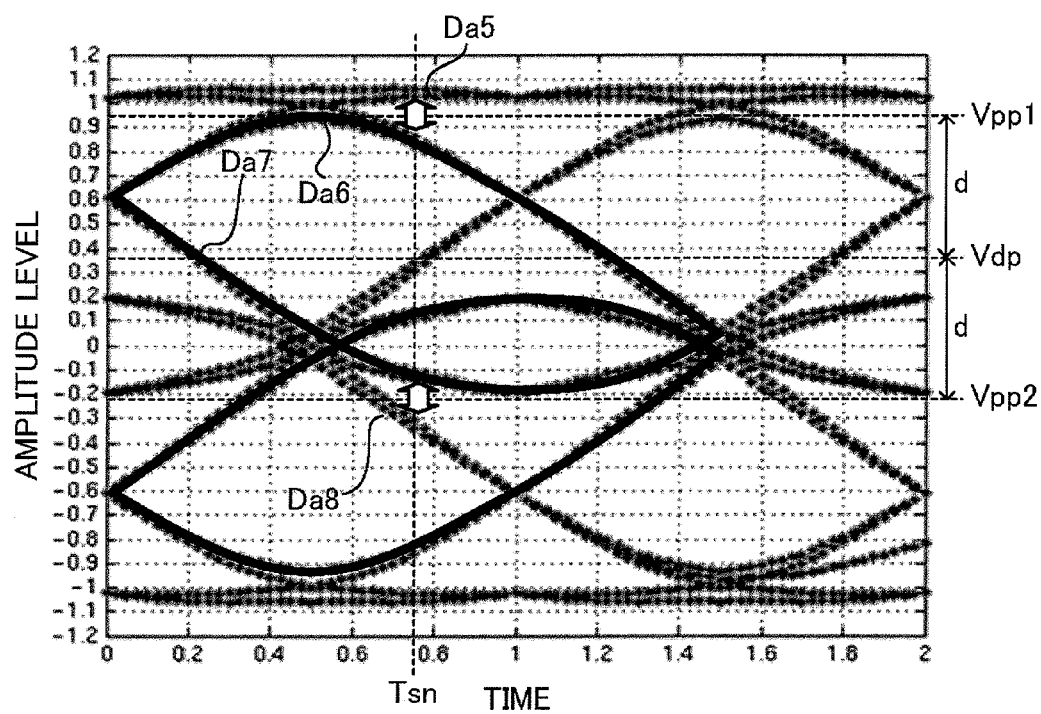
FIG. 8 is a view illustrating an example of an output data signal of an equalizer after optimization of an equalization level.

FIG. 8 is a view illustrating an example of an output data signal of an equalizer after optimization of an equalization level. In the example of FIG. 8, when the threshold value for error detection is set as the threshold value Vpp1, the output data signal Da5 is larger than the threshold value Vpp1 and thus the comparison result ERR becomes 1. The output data signals Da6, Da7 and Da8 other than the output data signal Da5 are smaller than the threshold value Vpp1 and thus the comparison result ERR becomes 0. In the meantime, when the threshold value for error detection is set as the threshold value Vpp2, the output data signal Da8 is larger than the threshold value Vpp1 and thus all the comparison results ERR become 0. The output data signals Da5, Da6 and Da7 other than the output data signal Da8 are larger than the threshold value Vpp1 and thus the comparison result ERR becomes 1. Accordingly, the probability that the comparison result ERR becomes 1 becomes the same as the probability that the comparison result ERR becomes 0, so that the sampling phase is converged.

Figure 9:
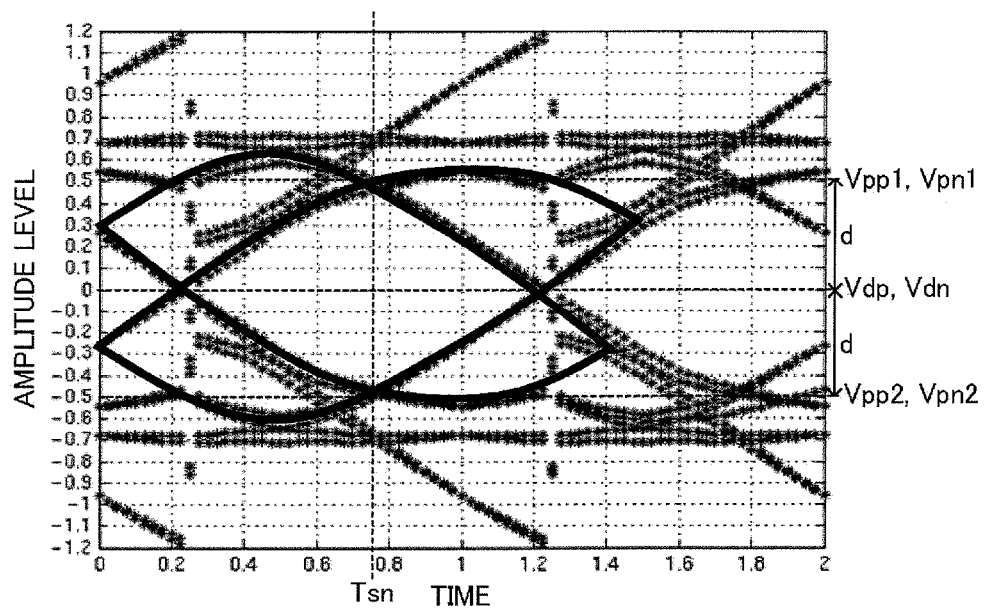
FIG. 9 is a view illustrating the example of an output signal of a selector after a phase adjustment and an equalization level optimization in an analog waveform.

FIG. 9 is a view illustrating the example of an output signal of a selector after a phase adjustment and an equalization level optimization in an analog waveform. The output signal (data determination result Do) of the selector 5 is a signal consisting of zeros and ones (0/1) and thus, the waveform of the output signal may not be actually drawn. However, a result of a speculative DFE processing by the reception circuit 1 is represented in an analog waveform, for explanation.

The threshold values Vdp and Vdn shift to 0 (zero) by the speculative DFE processing using the threshold value Vpp1, Vpp2, Vpn1, and Vpn2, and also the waveforms also shift simultaneously to become waveforms having an amplitude of the expectation value "d" illustrated in FIG. 9. Further, a waveform in which the sampling phase Tsn becomes the center of the eye opening is obtained.

As described above, the reception circuit 1 of the present embodiment uses one of the threshold values Vdp and Vdn for DFE for the data determination and uses the other of the threshold values Vdp and Vdn for the phase detection, based on the data determination result at a sampling phase right before the current sampling phase. Accordingly, the threshold value for the phase detection may not be added and thus an increase of the number of comparators may be suppressed. Accordingly, it is possible to implement the reception circuit 1 which performs the speculative DFE and the baud rate tracking CDR in a small-scale circuit.

Further, when the number of comparators is small, the data buffer or clock buffer which drives the comparator may be implemented in a small scale. Therefore, the circuit size may be reduced and low power consumption may be achieved. Further, an equalization coefficient is adaptively adjusted in such a manner that the threshold values Vdp and Vdn for DFE are set according to the amplitude of the output data signal of the equalizer 2 and the threshold value for error detection are set based on the threshold values Vdp and Vdn. Therefore, a waveform in which the set sampling phase is located at an appropriate position may be generated.

In the meantime, the description has been made on the reception circuit 1 having the functionality of a 1-tap speculative DFE, but may also be adapted for a multi-tap DFE. In such a case, when a speculative DFE is arranged at a first tap for which a strict velocity of the feedback loop is required and DFEs are arranged at a second tap and on, the reception circuit 1 illustrated in FIG. 1 may be applied as it is. When a two or more-tap speculative DFE is applied, the number of threshold values to be set increases. Hereinafter, a reception circuit having functionality of a two-tap speculative DFE will be described as an example.

Second Embodiment

Figure 10:
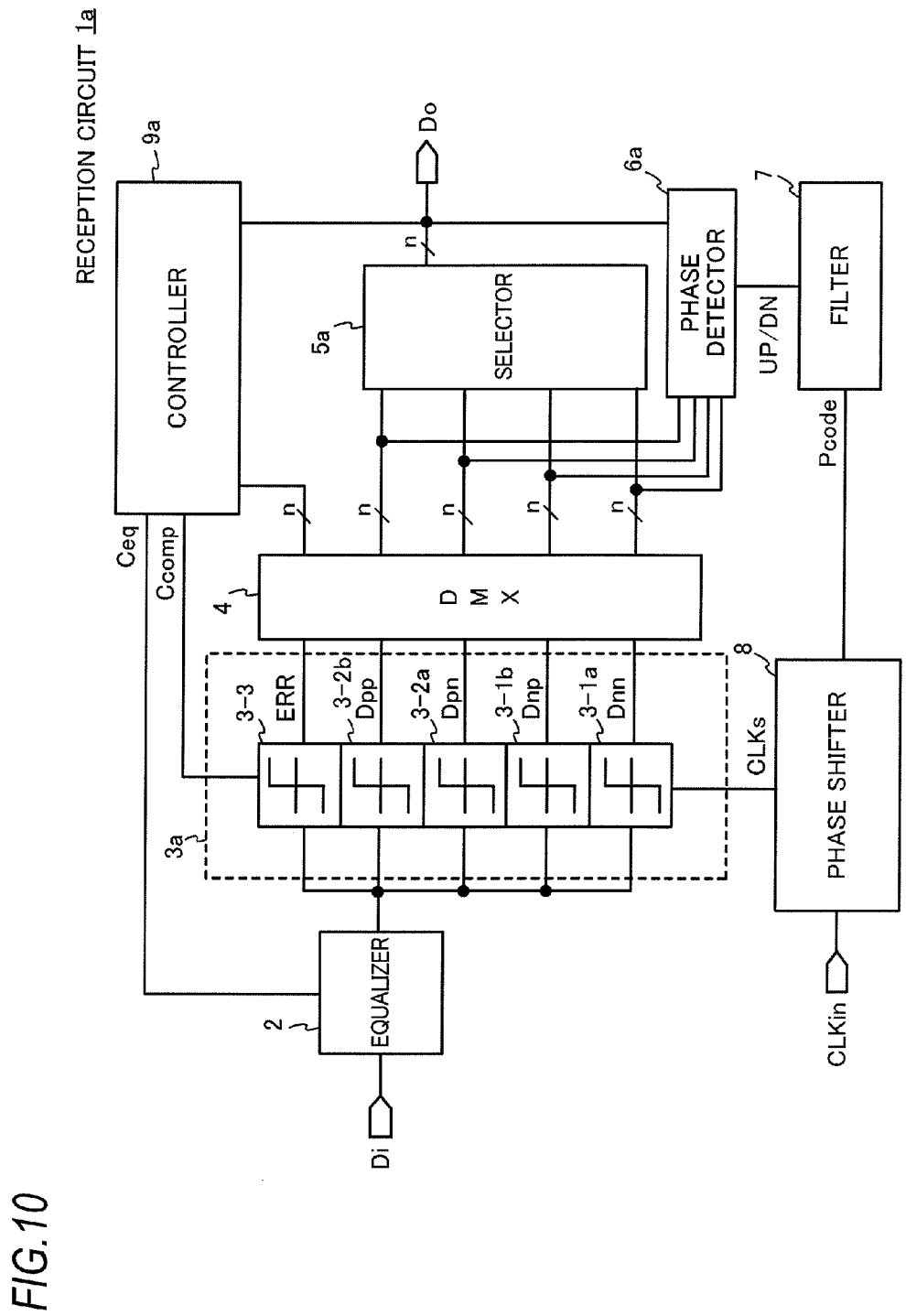
FIG. 10 is a view illustrating an exemplary reception circuit according to a second embodiment.

FIG. 10 is a view illustrating an exemplary reception circuit according to a second embodiment. Similar constitutional elements as those illustrated in FIG. 1 are denoted by similar reference numerals and descriptions thereof will be omitted.

A comparator 3a of a reception circuit 1a includes comparators 3-1a, 3-1b, 3-2a, 3-2b and 3-3 in order to implement a two-tap speculative DFE. The threshold value for DFE is set by the controller 9a in the comparator 3-1a, 3-b, 3-2a, 3-2b.

Figure 11:
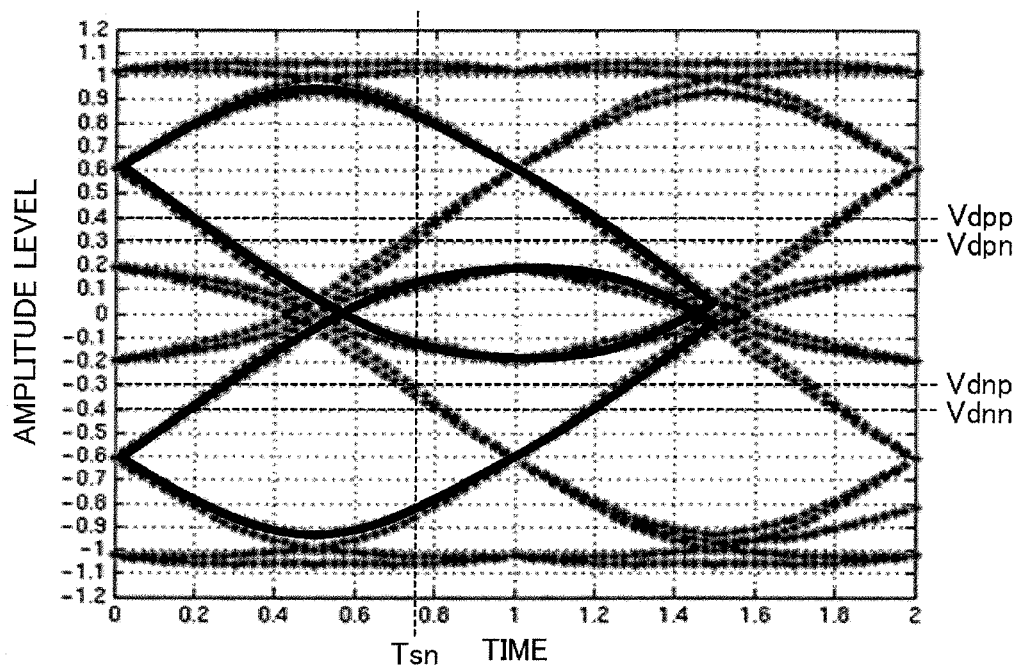
FIG. 11 is a view illustrating an example of a threshold value setting for DFE in the reception circuit according to the second embodiment.

FIG. 11 is a view illustrating an example of a threshold value setting for DFE in the reception circuit according to the second embodiment. In FIG. 11, the output data signals of the equalizer 2 having a plurality of data patterns are represented to overlap with each other. The horizontal axis indicates time and the vertical axis indicates amplitude level of the output data signal. In the meantime, the amplitude of the output data signal is normalized to "±1".

When the data determination results Do one bit ahead and two bits ahead with respect to a bit determined at the timing of the sampling phase Tsn are 1 (one), the comparison result Dpp for which the threshold value Vdpp is used is selected as the data determination result Do in the sampling phase Tsn in a selector 5a. Further, a phase detector 6a detects phase information according to the comparison result Dnp obtained using the threshold value Vdnp, which is not used for the data determination.

When the data determination result Do of a bit 1 bit ahead is 1 and the data determination result Do of a bit 2 bits ahead with respect to a bit determined at the timing of the sampling phase Tsn is 0, the comparison result Dpn obtained using the threshold value Vdpn is selected as the data determination result Do. Further, the phase detector 6a detects phase information according to the comparison result Dnn obtained using the threshold value Vdnn, which is not used for the data determination.

When the data determination result Do of a bit 1 bit ahead with respect to a bit determined at the timing of the sampling phase Tsn is 0 and the data determination result Do of a bit 2 bits ahead with respect to a bit determined at the timing of the sampling phase Tsn is 1, the comparison result Dnp obtained using the threshold value Vdpn is selected as the data determination result Do. Further, the phase detector 6a detects a phase information according to the comparison result Dpp obtained using the threshold value Vdpp, which is not used for the data determination.

When the data determination results Do one bit ahead and two bits ahead with respect to a bit determined at the timing of the sampling phase Tsn are 0, the comparison result Dnn obtained using the threshold value Vdnn is selected as the data determination result Do. Further, the phase detector 6a detects a phase information according to the comparison result Dpn obtained using the threshold value Vdpn, which is not used for the data determination.

In the meantime, the threshold values Vdpp, Vdpn, Vdnp and Vdnn are adjusted based on the amplitude of the output data signal of the equalizer 2 detected in the controller 9a, similarly to the threshold values Vdp and Vdn in the reception circuit 1 of the first embodiment.

The threshold values Vdpp, Vdpn, Vdnp and Vdnn may be set so that positions in the direction of phase of cross points between data for phase detection and the threshold values Vdpp, Vdpn, Vdnp and Vdnn correspond to phases located at the center of the eye opening in order to detect the phase deviation to the ideal sampling phase Tsn. In the example of FIG. 11, the threshold value Vdpp is set to "+0.4", the threshold value Vdpn is set to "+0.3", the threshold value Vdnp is set to "−0.3", and the threshold value Vdnn is set to "−0.4" for a case where the amplitude of the output data signal of the equalizer 2 is normalized to "±1".

FIG. 12 is a view illustrating another example of the phase detection algorithm. Dn−2 indicates an (n−2)-th bit data determination result, Dn−1 indicates an (n−1)-th bit data determination result, and Dn+1 indicates (n+1)-th bit data determination result. Dpp_n, Dpn_n, Dnp_n, and Dnn_n indicate n-th bit comparison results Dpp, Dpn, Dnp, and Dnn, respectively.

When a data pattern of bits from (n−2)-th bit to (n+1)-th bit is "0011", the phase information UP/DN is changed according to a value of Dpn_n. For example, when Dpn_n is 1, the phase information UP/DN becomes+1, and when Dpn_n is 0, the phase information UP/DN becomes "−1".

When a data pattern of bits from (n−2)-th bit to (n+1)-th bit is "1011", the phase information UP/DN is changed according to a value of Dpp_n. For example, when Dpp_n is 1, the phase information UP/DN becomes +1, and when Dpp_n is 0, the phase information UP/DN becomes "−1".

When a data pattern of bits from (n−2)-th bit to (n+1)-th bit is "0100", the phase information UP/DN is changed according to a value of Dnn_n. For example, when Dnn_n is 0, the phase information UP/DN becomes +1, and when Dnn_n is 1, the phase information UP/DN becomes "−1".

When a data pattern of bits from (n−2)-th bit to (n+1)-th bit is "1100", the phase information UP/DN is changed according to a value of Dnp_n. For example, when Dnp_n is 0, the phase information UP/DN becomes "+1", and when Dnp_n is 1, the phase information UP/DN becomes "−1".

In the meantime, in the example of FIG. 12, when other data patterns are input, the phase information UP/DN becomes 0. As described above, the phase shifter 8 performs the phase adjustment using the phase adjustment code Pcode generated in the filter 7 based on the phase information UP/DNn obtained in the phase detector 6a.

The equalization coefficient Ceq is adjusted similarly as in the reception circuit 1 of the first embodiment but the threshold value for error detection is obtained by adding or subtracting the expectation value "d" described above to or from each of the threshold values Vdpp, Vdpn, Vdnp, and Vdnn for DFE.

In the meantime, an example of the selector 5a in the reception circuit 1a of the second embodiment is implemented by, for example, a circuit as follows.

Figure 13:
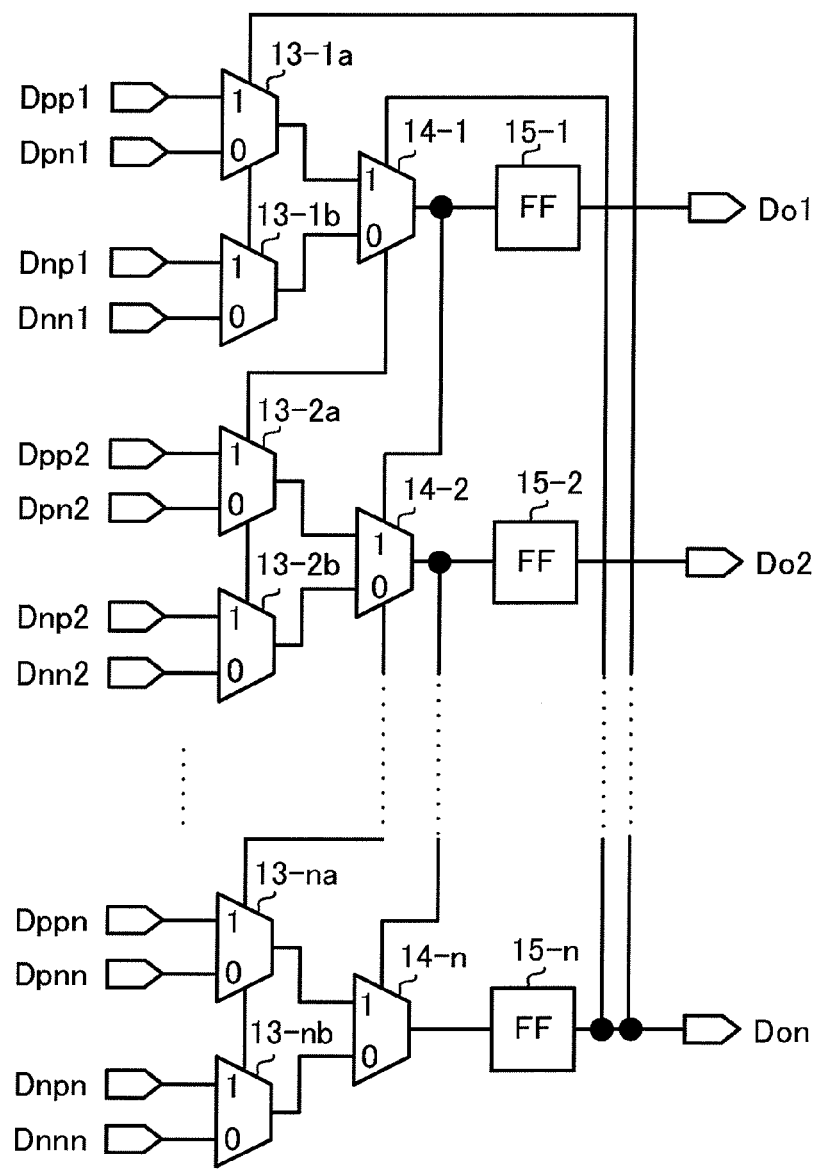
FIG. 13 is a view illustrating an exemplary selector in the reception circuit according to the second embodiment.

FIG. 13 is a view illustrating an exemplary selector in the reception circuit according to the second embodiment. The selector 5a includes selectors 13-1a, 13-2a, ..., 13-na that select one of the comparison results Dpp1, Dpp2, ..., Dppn and the comparison results Dpn1, Dpn2, ..., Dpnn that are multiplexed. Further, the selector 5a includes selectors 13-1b, 13-2b, ... 13-nb that select one of the comparison results Dnp1, Dnp2, Dnpn and the comparison results Dnn1, Dnn2, ..., Dnnn that are multiplexed. In the meantime, the comparison results Dpp1 to Dppn, Dpn1 to Dpnn, Dnp1 to Dnpn, and Dnn1 to Dnnn are n-bit parallel data and arranged in a row of chronological data in a sequential order of 1 to n.

Further, the selector 5a includes selectors 14-1, 14-2, ..., 14-n that select one of output signals of the selectors 13-1a to 13-na or the selectors 13-1b to 13-nb. Further, the selector 5a includes FFs 15-1, 15-2, ..., 15-n that maintain the results selected in the selectors 14-1 to 14-n. Though not illustrated, a clock signal is input to the FFs 15-1 to 15-n and the FFs 15-1 to 15-n are operated at the same timing to output the data determination results Do1, Dot, ..., Don. The operating cycle of the FFs 15-1 to 15-n amounts to nUI [time for n bits of the input data signal Di of the reception circuit 1].

When the data determination result Don two bits ahead is 1, the selectors 13-1a to 13-na and 13-1b to 13-nb at the first stage select the comparison results Dpp1 to Dppn and the comparison results Dnp1 to Dnpn. When the data determination result Don two bits ahead is 0, the selectors 13-1a to 13-na and 13-1b to 13-nb select the comparison results Dpn1 to Dpnn and the comparison results Dnn1-Dnnn.

The selectors 14-1-14-n at the second stage select the output signals of the selectors 13-1a to 13-na when the data determination result Do1 to Don one bit ahead is 1, and select the output signals of the selectors 13-1b to 13-nb when the data determination result Do1 to Don one bit ahead is 0.

The selector 5a may be implemented by the circuits described above. The comparator which compares the threshold value for phase detection with the output data signal of the equalizer 2 also does not need to be installed in the reception circuit 1a of the second embodiment which corresponds to the two-tap speculative DFE described above, and thus it is possible to suppress an increase of a circuit area may be suppressed.

Third Embodiment

Figure 14:
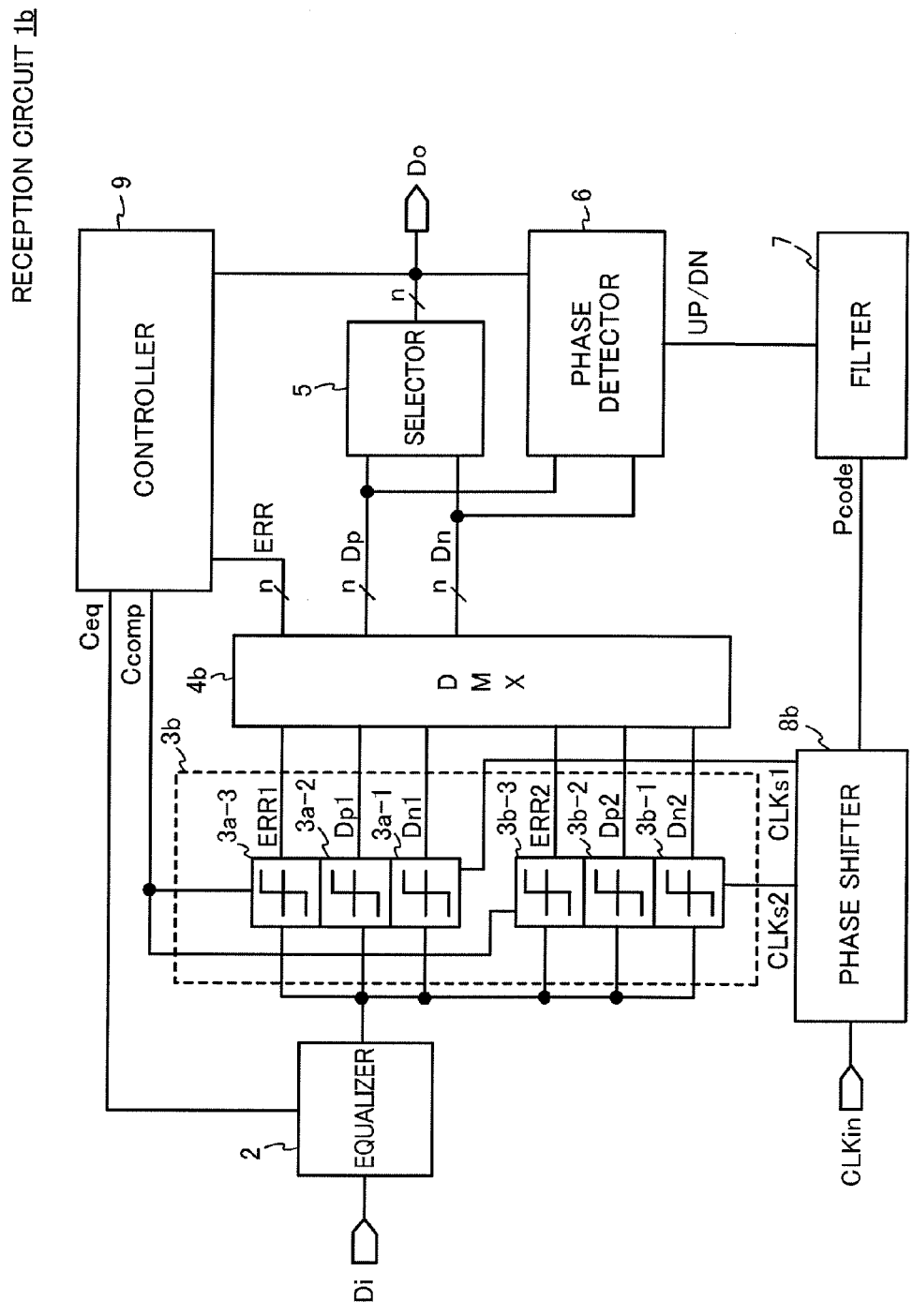
FIG. 14 is a view illustrating an exemplary reception circuit according to a third embodiment.

FIG. 14 is a view illustrating an exemplary reception circuit according to a third embodiment. Similar constitutional elements as those illustrated in FIG. 1 are denoted by similar reference numerals and descriptions thereof will be omitted.

A reception circuit 1b of the third embodiment is configured by a circuit with which an interleaving operation may be performed. Accordingly, even when the frequency of the input data signal Di is fast, the reception circuit 1b may be operated by performing a parallel processing.

A comparator 3b of the reception circuit 1b is configured in a parallel architecture of the comparators 3a-1, 3a-2, 3a-3 and the comparators 3b-1, 3b-2, 3b-3 in order to allow the interleaving operation to be performed.

The same threshold value [negative side (see FIG. 3)] for DFE is set by the controller 9 in the comparators 3a-1 and 3b-1. The same threshold value [positive side (see FIG. 3)] for DFE is set by the controller 9 in the comparators 3a-2 and 3b-2. Further, the same threshold value for error detection is set by the controller 9 in the comparators 3a-3 and 3b-3.

The comparators 3a-1, 3a-2 and 3a-3 are driven by a sampling clock CLKs1 and the comparators 3b-1, 3b-2 and 3b-3 are driven by a sampling clock CLKs2. The phase difference between the sampling clock CLKs1 and the sampling clock CLKs2 corresponds to, for example, the size of 1 UI of the input data signal Di.

The respective comparators 3a-1, 3a-2 and 3a-3 output the comparison results Dn1, Dp1 and ERR1, respectively. In the meantime, the respective comparators 3b-1, 3b-2 and 3b-3 output the comparison results Dn2, Dp2 and ERR2, respectively. Further, a DMX 4b inverse-multiplexes 2 (two) bits into n bits to be output in the reception circuit 1b of the present embodiment. The DMX 4b inverse-multiplexes 2 (two) bits of Dn1 and Dn22, each of which is 1 (one) bit, into n bits to be output as the comparison result Dn, and 2 (two) bits of Dp1 and Dp22, each of which is 1 (one) bit, into n bits to be output as the comparison result Dp. Further, the DMX 4b inverse-multiplexes 2 (two) bits of ERR1 and ERR2, each of which is 1 (one) bit, into n bits to be output as the comparison result ERR.

Operations other than the interleaving operation are the same as in the reception circuit 1 of the first embodiment and the same effect as in the reception circuit 1 of the first embodiment may be achieved. In the meantime, the reception circuit 1b is a circuit which performs the interleaving operation with two-parallelism, but the number of parallel operations is not limited thereto and three or more-parallelism may be adopted.

Fourth Embodiment

Figure 15:
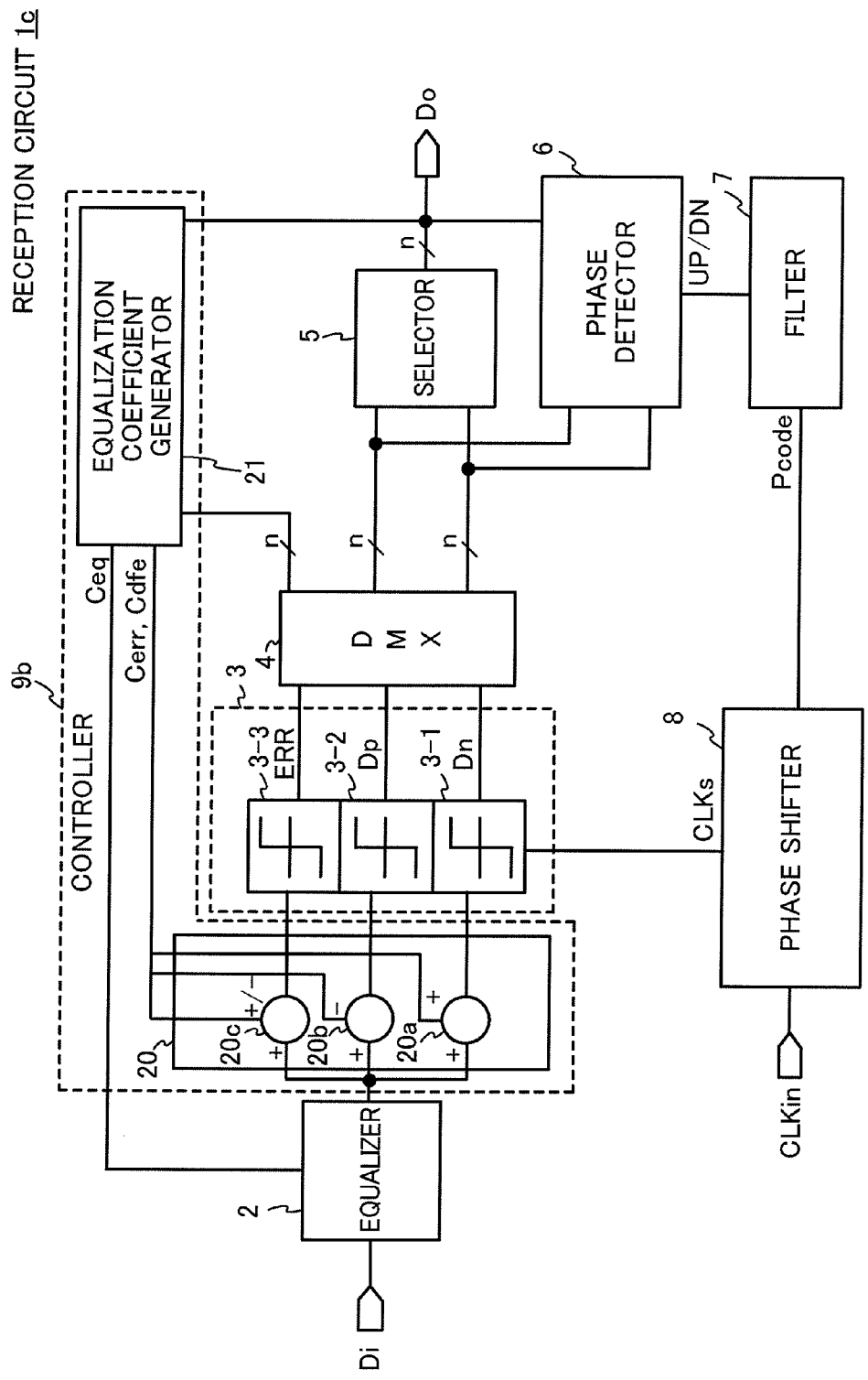
FIG. 15 is a view illustrating an exemplary reception circuit according to a fourth embodiment.

FIG. 15 is a view illustrating an exemplary reception circuit according to a fourth embodiment. Similar constitutional elements as those of the reception circuit 1 illustrated in FIG. 1 are denoted by similar reference numerals, and descriptions thereof will be omitted.

The output data signal of the equalizer 2 is directly input to the comparator 3 to adjust the threshold value to be set in the comparator 3 in the reception circuit 1 of the first embodiment. In contrast, a reception circuit 1c of the fourth embodiment fixes the threshold value to be set in the comparator 3 and adjusts the respective amplitudes of the output data signals of the equalizer 2 to be input to the comparators 3-1, 3-2 and 3-3 to levels according to the respective threshold values, respectively. The threshold value itself is fixed to, for example, a half of the amplitude of the output data signal in the reception circuit 1c of the fourth embodiment.

Therefore, the controller 9b of the reception circuit 1c includes an addition-subtraction unit 20 and an equalization coefficient generator 21. The equalization coefficient generator 21 has the same functionality as that of the controller 9 illustrated in FIG. 1 but supplies a value to the addition-subtraction unit 20 instead of setting the threshold value in the comparator 3.

The addition-subtraction unit 20 includes an adder 20a which adds an equalization coefficient Cdfe to the output data signal of the equalizer 2 and a subtractor 20b which subtracts the equalization coefficient Cdfe from the output data signal of the equalizer 2. Further, the addition-subtraction unit 20 includes an adder-subtractor 20c which adds or subtracts an equalization coefficient Cerr, which is according to an error level intended to be detected, to or from the output data signal of the equalizer 2.

The equalization coefficients Cdfe and Cerr are supplied to the addition-subtraction unit 20 by the equalization coefficient generator 21. The equalization coefficient Cdfe is determined based on the amplitude of the output data signal and has the same size of, for example, the threshold values Vdn and Vdp described above. The equalization coefficient Cerr is obtained by adding or subtracting the equalization coefficient Cdfe to or from the expectation value "d", similarly to the relationship between the threshold values Vdn and Vdp and the threshold value for error detection.

The output of the adder 20a is input to the comparator 3-1 and the comparison result Dn resulted from the comparison of the input value with the fixed threshold value is output from the comparator 3-1. The output of the subtractor 20b is input to the comparator 3-2 and the comparison result Dp resulted from the comparison of the input value with the fixed threshold value is output from the comparator 3-2.

The output of the adder-subtractor 20c is input to the comparator 3-3 and the comparison result ERR resulted from the comparison of the input value with the fixed threshold value is output from the comparator 3-3. The comparison results Dp, Dn and ERR output from the comparators 3-1, 3-2 and 3-3 becomes the same value those obtained by the reception circuit 1, respectively. Therefore, other operations are the same as those of the reception circuit 1 of the first embodiment and the same effect as that of the reception circuit 1 of the first embodiment may be obtained in the reception circuit 1c illustrated in FIG. 15.

As described above, an aspect of the present disclosure has been described based on the embodiments, but these embodiments are illustrative only and are not meant to be limited to the matters described above. For example, the embodiments may be appropriately combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reception circuit to reproduce a data signal based on a data determination result of determining an amplitude level of an input data signal at a sampling timing synchronized with a sampling clock, the reception circuit comprising:
    an equalizer configured to perform an equalization process on the input data signal;
    a comparator configured to compare an output data signal of the equalizer with a first threshold value, a second threshold value, and a third threshold value at a first sampling timing to output a first comparison result, a second comparison result, and a third comparison result, respectively;
    a selector configured to select any one of the first comparison result and the second comparison result based on the data determination result at a second sampling timing before the first sampling timing, and update the data determination result;
    a phase detector configured to detect phase information based on the first comparison result or the second comparison result which is not selected by the selector;
    a phase shifter configured to adjust a phase of the sampling clock based on the phase information detected by the phase detector; and
    a controller configured to set the third threshold value based on the first threshold value and the second threshold value by either adjusting the first threshold value and the second threshold value based on the amplitude of the output data signal or adding or subtracting a first value to or from the output data signal, detect an equalization result at the equalizer based on the third comparison result by the set third threshold value, and adjust an equalization coefficient of the equalizer based on the detected equalization result.

2. The reception circuit according to claim 1, wherein the phase detector is configured to detect whether a phase of the sampling clock lags behind a phase of the output data signal based on whether amplitude of the output data signal, which varies with a first data pattern, at the first sampling timing is larger than the first threshold value or the second threshold value.

3. The reception circuit according to claim 1, wherein the controller is configured to add or subtract an expectation value of the amplitude of the output data signal to or from the first threshold value or the second threshold value so as to set a plurality of third threshold values at different timings, and adjust the equalization coefficient so that an occurrence probability of a state where the third comparison result indicates that an amplitude level of the output data signal having the plurality of data patterns exceeds the third threshold value becomes equal to an occurrence probability of a state where the third comparison result indicates that an amplitude level of the output data signal having the plurality of data patterns does not exceed the third threshold value.

4. The reception circuit according to claim 2, wherein the controller is configured to adjust the first threshold value or the second threshold value so that a phase of a cross point between the first threshold value or the second threshold value and the output data signal, which varies with the first data pattern is located at the center of an eye opening formed by the output data signal having the plurality of data patterns.

5. The reception circuit according to claim 1, wherein
the first threshold value or the second threshold value is a half of the amplitude of the output data signal,
the, controller is configured to control the first value based on the amplitude of the output data signal, and
the comparator is configured to compare the output data signal to or from which the first value is added or subtracted, with the first threshold value and the second threshold value to output the first comparison result and the second comparison result, respectively.

* * * * *